United States Patent

Krupa

[15] 3,662,286

[45] May 9, 1972

[54] GATED OSCILLATOR

[72] Inventor: John Eugene Krupa, Morrestown, N.J.

[73] Assignee: The United States of America as represented by the Secretary of the Air Force

[22] Filed: Jan. 20, 1971

[21] Appl. No.: 107,962

[52] U.S. Cl. ....................331/108, 331/140, 331/173
[51] Int. Cl. ....................H03b 5/24
[58] Field of Search ....................331/110, 108, 140, 141, 173

[56] References Cited

UNITED STATES PATENTS 3,012,208 12/1961 Hassel....................331/171
3,070,762 12/1962 Evans....................331/141

*Primary Examiner*—John Kominski
*Attorney*—Harry A. Herbert, Jr. and George Fine

[57] ABSTRACT

A gated oscillator is provided which reproduces any part of or any number of sine wave cycles such as a cosine squared pulse, for example. The equation for the output may be expressed as $e_o = \sin(wt + \phi)$ where $\phi$ and $t$ are determined by the gating. Since $\phi$ is the initial phase angle or amplitude of the sine wave and it determines the number of cycles, it is possible to start the sine wave at any angle from 0° to 360° and let it continue for any number of cycles.

2 Claims, 4 Drawing Figures

INVENTOR
JOHN E. KRUPA
BY Harry A. Herbert Jr and
George Fine
ATTORNEYS

GATED OSCILLATOR

BACKGROUND OF THE INVENTION

This invention relates to oscillators and more particularly to gated oscillators reproducing any part of or any number of sine wave cycles such as a cosine squared pulse.

In certain applications a gated sine wave with controlled initial phase is required such as the 318 mcs oscillator in color TV, frequency synthesizers, phase controlled telemetry and phase coded radar. However, the prior art oscillators have several limitations such as the sine wave, or fraction thereof, was not reproduced accurately; the gating locked effectiveness; the frequency bandwidth was not wide enough; and the frequency was not sufficiently stable nor low enough.

The gated oscillator of the present invention was devised to produce any part of a sine wave or any number of cycles at some specified initial phase, such as is required in a pulsed cosine square wave generator, etc. It is possible to start the sine wave at any angle from 0° to 360° and let it continue for any number of degrees. The advantages of producing a gated sine wave with the device of this invention are numerous. The frequency can be varied over a wide range. Very low frequencies are readily available because no inductance is used. The gating is very effective. No spikes or overshoots are produced because no inductors are used. The components utilized are in the same state during static or off condition as they are during the cycle, hence there are no bothersome transients. The sine wave, or fraction thereof, produced by the device is essentially perfect. No other device presently in use can reproduce a sine wave as accurately.

The device of the present invention was originally designed to produce a cosine squared pulse, with an initial phase angle of 20°, and to produce a rectangular pulse with the leading and trailing edge equivalent to a cosine squared pulse. This device may be used whereever a gated sine wave with a controlled initial phase is required.

SUMMARY OF THE INVENTION

A gated oscillator is provided which includes an RC network to produce the sine wave. The network includes a pair of capacitors, $C_1$ and $C_2$. The output voltage of the network is in phase with the input voltage but is one-third the magnitude. An amplifier with a gain of 3 is inserted between the output and input so that the network will oscillate with a frequency of $W = 1/RC$.

The voltages across $C_1$ and $C_2$ have different values for every part of the sine wave. Therefore, the voltages across $C_1$ and $C_2$ are made to have different values for every part of the sine wave. It is required to start the oscillator at a specific phase, and the two capacitors are initially charged to correct voltage values. In charging capacitors $C_1$ and $C_2$ to the correct value, two FET gates are provided. The circuit is characterized principally by RC elements so that as soon as the gates are turned on the amplifier gain is insufficient to maintain oscillation. Upon turning off the gates with capacitors $C_1$ and $C_2$ being charged to the required levels the network begins oscillation with an initial phase determined by the charges established on $C_1$ and $C_2$.

DETAILED DESCRIPTION OF THE PREFERRED EMBODIMENT

Figure 1:
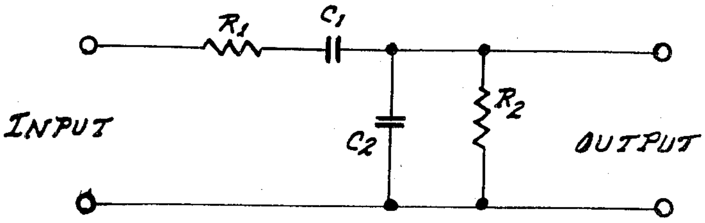
FIG. 1 is a schematic diagram of the RC network included in the gated oscillator.

Now referring in detail to FIG. 1, the input impedance of the network is $$Z_{in} = R_1 + \frac{1}{JwC_1} + \frac{R_2}{(JwC_2R_2+1)}$$

$$= \frac{1 - W^2R_1R_2C_1C_2 + Jw[R_1C_1 + R_2C_2 + C_1R_2]}{JwC_1(JwC_2R_2+1)}$$

If we choose $R_1 = R_2$, $C_1 = C_2$ and $$w = \frac{1}{RC}$$

then $$Z_{in} = \frac{3R}{(JwCR+1)} = \frac{3R}{2} \angle -45°$$

The current I for an input voltage E cos ($wt$) is:

$$I = \frac{E\cos(wt)}{Z_{in}} = \frac{\sqrt{2}}{3R} E\cos(wt + 45°)$$

The impedance across $R_2C_2$ is $$\frac{R_2}{(JwC_2R_2+1)}$$

or $$\frac{R_2}{\sqrt{2}} \angle -45°$$

---

Therefore the output voltage $e_o$ is:

$$e_o = IZ = ⅓ \cos(wt).$$

The output voltage is in phase with the input voltage but is one-third the magnitude. If an amplifier with a gain of 3 is inserted between the output and input, the network will oscillate with a frequency of $w = 1/RC$.

Figure 2A:
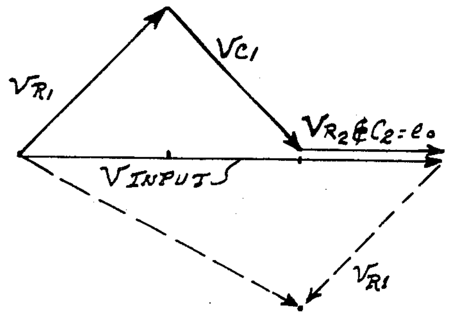
FIG. 2*a* illustrates voltages on FIG. 1 plotted in vector form.
Figure 2B:
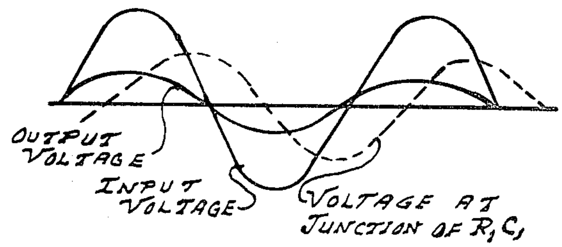
FIG. 2*b* illustrates voltages for FIG. 1 plotted in instantaneous form.

The voltages across $C_1$ and $C_2$ have different values for every part of the sine wave. Therefore, if the oscillator is to be started at any specific phase, the two capacitors must be initially charged to the correct values. The relative magnitudes of the voltages across the various components in the network must be determined by multiplying the current by the appropriate impedance. The voltage across $R_1$ is $RI = \sqrt{2/3}\, E \cos(wt + 45°)$; across $C_1$ the voltage is $I(1/JWC_1) = 2/3\, E \cos(wt - 45°)$; and across $R_2C_2$ the voltage is $1/3\, E \cos wt$. These voltages are plotted in vector form and instantaneous form in FIGS. 2*a* and 2*b*.

Figure 3:
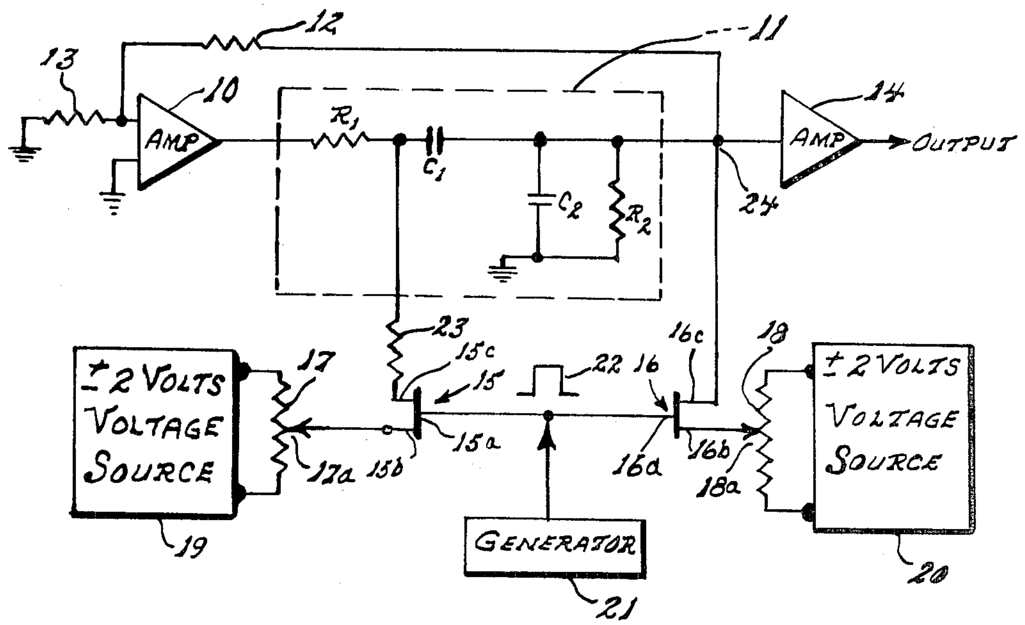
FIG. 3 shows a schematic diagram of the gated oscillator of this invention.

To charge $C_1$ and $C_2$ to the correct values, two FET gates are provided as shown in the complete schematic of FIG. 3.

Now referring in detail to FIG. 3, there is shown network 11 which is identical to that shown in FIG. 1 and it may be referred to as a sine wave generator.

The output voltage of the sine wave generator is $e_o = IZ = ⅓ \cos(wt)$. The output voltage is in phase with the input voltage but is one-third the magnitude. Amplifier 10 with a gain of 3 is inserted between output and input so that network 11 will oscillate with a frequency of $w = 1/RC$. Resistors 12 and 13 are provided to obtain the proper impedance for the desired gain. Amplifier 14 is utilized to provide additional gain, as required, for the output signal from the gated oscillator.

It is noted, as previously described, that the voltages across $C_1$ and $C_2$ of the sine wave generator have different values for every part of the sine wave. When it is required to start the oscillator at a specific phase, the two capacitors are initially charged to predetermined voltage values. In charging capacitors $C_1$ and $C_2$ to the correct or predetermined values, two FET gates 15 and 16 are provided.

Calibrated potentiometers 17 and 18 are connected across ± volts voltage sources 19 and 20, respectively. Movable arms **17*a* and 18*a* of potentiometers 17 and 18 are connected to electrodes 15*b* and 16*b* of FETS 15 and 16, respectively. Electrode 15*c* of FET 15 is connected to the junction point of resistor $R_1$ and capacitor $C_1$ by way of resistor 23. Electrode 16*c* of FET 16 is connected to junction point 24. Electrodes 15*a* and 16*a* of FETS 15 and 16 are connected together and simultaneously receive gating pulse 22 from gate pulse generator 21. As soon as the gate FETS 15 and 16 are turned on upon receiving gating pulse 22**, the amplifier gain of 3 is not sufficient to maintain oscillation. Capacitors $C_1$ and $C_2$ will charge to the required levels. When the gates are turned off upon the cessation of the gating pulse, the network (sine wave generator) starts to oscillate with an initial phase determined by the charge on capacitors $C_1$ and $C_2$.

It is again noted that the voltages across capacitors $C_1$ and $C_2$ have different values for every part of the sine wave. These values may be predetermined and then each value may have a corresponding number on calibrated potentiometers 15 and 16. In the alternative, voltage measurements means may be connected to the junction of resistor $R_1$ and capacitor $C_1$ and also to junction point 24.

What is claimed is:

1. A gated oscillator producing a preselected part of a sine wave at a specified phase comprising a network consisting of an input and output terminal and a junction point and having a first resistor and first capacitor connected in a series arrangement between said input terminal and said junction point, a second resistor and second capacitor in a parallel arrangement connected between said junction point and ground, said output terminal also being connected to said junction point, said network operating as a sine wave generator, an amplifier having an input and output terminal, the output terminal of said amplifier being connected to the input terminal of said network and the output terminal of said network being connected to said input terminal of said amplifier, and means to charge said first and said second capacitors to a predetermined value to produce said specified phase and thereupon initiating oscillation in the combination of said amplifier and network upon said first and second capacitors attaining said predetermined value.

2. A gated oscillator as described in claim 1 wherein said means to charge said first and second capacitors is comprised of a first calibrated voltage source and a second calibrated voltage source, a first FET gate and a second FET gate normally inoperative, said first FET gate interconnecting said first calibrated voltage source to the junction of said first resistor and said first capacitor, said second FET gate interconnecting said second calibrated voltage source and said output terminal of said network, and means to gate on said first and second FET gates for a preselected time.

* * * * *